(12) United States Patent
Samudrala

(10) Patent No.: US 11,593,099 B2
(45) Date of Patent: *Feb. 28, 2023

(54) SELF-LEARNING CODE CONFLICT RESOLUTION TOOL

(71) Applicant: Bank of America Corporation, Charlotte, NC (US)

(72) Inventor: Harikrishna Samudrala, Hyderabad (IN)

(73) Assignee: Bank of America Corporation, Charlotte, NC (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/399,439

(22) Filed: Aug. 11, 2021

(65) Prior Publication Data

US 2021/0373883 A1    Dec. 2, 2021

Related U.S. Application Data

(63) Continuation of application No. 16/718,580, filed on Dec. 18, 2019, now Pat. No. 11,119,759.

(51) Int. Cl.
  *G06F 9/44* (2018.01)
  *G06F 8/71* (2018.01)
  *G06N 3/04* (2023.01)
  *G06N 20/00* (2019.01)

(52) U.S. Cl.
  CPC ............ *G06F 8/71* (2013.01); *G06N 3/04* (2013.01); *G06N 20/00* (2019.01)

(58) Field of Classification Search
  None
  See application file for complete search history.

(56) References Cited

U.S. PATENT DOCUMENTS

| | | |
|---|---|---|
| 6,473,851 B1 | 10/2002 | Plutowski |
| 6,678,882 B1 | 1/2004 | Hurley et al. |
| 7,321,883 B1 | 1/2008 | Freedy et al. |
| 7,761,478 B2 | 7/2010 | Akkiraju et al. |
| 7,778,963 B2 | 8/2010 | Novik et al. |
| 7,958,489 B2 | 6/2011 | Meijer et al. |
| 8,312,437 B2 | 11/2012 | Villadsen |
| 8,555,250 B2 | 10/2013 | Fanning et al. |
| 8,712,758 B2 | 4/2014 | Crouch et al. |
| 8,996,994 B2 | 3/2015 | Alonichau et al. |
| 9,128,805 B2 | 9/2015 | Michaely et al. |

(Continued)

OTHER PUBLICATIONS

Ghiotto, G. et al., "On the Nature of Merge Conflicts: a Study of 2,731 Open Source Java Projects Hosted by GitHub," IEEE Transactions on Software Engineering, vol. 46, Issue: 8, Sep. 19, 2018, pp. 892-915.

(Continued)

*Primary Examiner* — Insun Kang

(57) ABSTRACT

An apparatus includes a memory and a processor configured to merge a first code branch and a second code branch of a code development project. The memory stores a machine learning model. The processor identifies a first conflict and a second conflict between the first code branch and the second code branch. The processor uses a machine learning model to determine a resolution for the first conflict based in part on a set of requirements for the code development project. The processor then applies the resolution to the integrated code.

20 Claims, 5 Drawing Sheets

(56) References Cited

U.S. PATENT DOCUMENTS

| | | |
|---|---|---|
| 9,448,791 B1 | 9/2016 | Mcfarlane et al. |
| 9,454,459 B2 | 9/2016 | Bigwood et al. |
| 9,575,764 B1 | 2/2017 | Turner et al. |
| 9,619,209 B1 | 4/2017 | Allen et al. |
| 9,928,040 B2 | 3/2018 | Tarlow et al. |
| 9,995,655 B2 | 6/2018 | Dagnino et al. |
| 10,289,407 B1 | 5/2019 | Turner et al. |
| 10,348,658 B2 | 7/2019 | Rodriguez et al. |
| 10,359,783 B2 | 7/2019 | Williams et al. |
| 10,360,023 B2 | 7/2019 | Cowan et al. |
| 10,403,016 B2 | 9/2019 | Thomson et al. |
| 10,404,636 B2 | 9/2019 | Rodriguez et al. |
| 10,437,931 B1 | 10/2019 | Matskevich et al. |
| 10,452,863 B2 | 10/2019 | Miller |
| 2005/0114456 A1 | 5/2005 | Mathew et al. |
| 2011/0004702 A1 | 1/2011 | Tsofi et al. |
| 2014/0279739 A1 | 9/2014 | Elkington et al. |
| 2015/0269494 A1 | 9/2015 | Kardes et al. |
| 2016/0357790 A1 | 12/2016 | Elkington et al. |
| 2017/0033944 A1 | 2/2017 | Nadathur et al. |
| 2017/0169092 A1 | 6/2017 | Baird et al. |
| 2017/0213127 A1 | 7/2017 | Duncan |
| 2017/0357697 A1 | 12/2017 | Gorjiara et al. |
| 2018/0069899 A1 | 3/2018 | Lang et al. |
| 2018/0165604 A1 | 6/2018 | Minkin et al. |
| 2018/0189369 A1 | 7/2018 | Baek et al. |
| 2018/0358000 A1 | 12/2018 | Amid et al. |
| 2019/0108001 A1 | 4/2019 | Hauser |
| 2019/0114549 A1 | 4/2019 | Olsher |
| 2019/0163875 A1 | 5/2019 | Allen et al. |
| 2019/0266418 A1 | 8/2019 | Xu et al. |
| 2019/0332983 A1 | 10/2019 | Li et al. |
| 2020/0097387 A1* | 3/2020 | Loyola .................. G06F 11/366 |
| 2020/0349133 A1 | 11/2020 | Dwarampudi et al. |
| 2021/0056007 A1* | 2/2021 | Viswanathan ...... G06F 11/3688 |
| 2021/0191715 A1 | 6/2021 | Samudrala |

OTHER PUBLICATIONS

Ziegler, T., "GITCoP: A Machine Learning Based to Approach to Predicting Merge Conflicts from Repository Metadata," University of Passau Department of Informatics and Mathematics, Jan. 20, 2017, 77 pages.

Owhadi-Kareshk, M. et al., "Predicting Merge Conflicts in Collaborative Software Development," IEEE International Symposium on Empirical Software Engineering and Measurement (ESEM), Sep. 1, 2019, 11 pages.

* cited by examiner

SELF-LEARNING CODE CONFLICT RESOLUTION TOOL

CROSS-REFERENCE TO RELATED APPLICATIONS

This application is a continuation of U.S. patent application Ser. No. 16/718,580 filed Dec. 18, 2019, by Harikrishna Samudrala, and entitled "SELF-LEARNING CODE CONFLICT RESOLUTION TOOL," which is incorporated herein by reference.

TECHNICAL FIELD

This invention relates generally to version control systems, and specifically to a self-learning tool for identifying and resolving conflicts between different versions of a code development project.

BACKGROUND

The software development process for a large-scale software project typically involves multiple developers working in parallel on the software. To enable such parallel development, a version control system is often used, which allows for "branching" of the software. A "branch" corresponds to a line of software development that exists independently from other lines of development but shares a common history. This common history may correspond to the "trunk" of the software project (i.e., the main body of the code development project). When a given software developer seeks to implement changes into the code, the developer may generate a copy of the trunk and store it as a branch, into which the developer may implement his/her changes. By generating multiple branches from the trunk, different developers may work to concurrently to implement their changes into the code, without interfering with the parallel development undertaken by other developers. Once a developer is satisfied with the changes he/she has made to the branch that he/she is working on, this branch may be merged back into the trunk, so that the main body of code can reflect the developer's changes.

When multiple developers attempt to merge their branches back into the trunk, inconsistencies between the various changes made by the developers may lead to merge conflicts. For example, a conflict may exist when a pair of developers each edit a line of code from the trunk in a different way. Similarly, a conflict may exist when a first developer edits a file from the trunk while a second developer deletes this same file. Traditional version control systems are able to detect such conflicts and present them to the developers for manual resolution. However, manual resolution is typically a time consuming and error-prone process, which diverts valuable developer time away from implementing new features into the software, potentially delaying the release of new software versions.

SUMMARY

This disclosure contemplates a self-learning code conflict resolution tool that addresses one or more of the above technical issues. The tool is designed to operate on a code development project stored in a source code repository. In contrast to existing version control systems that simply identify conflicts between different branches of a code development project (leaving resolution to the code developers), the tool may be used to automatically resolve conflicts and to merge the different branches of code into a single, integrated code. To accomplish this, the tool uses a machine learning algorithm trained to resolve the conflicts based on the existing code base and requirements specified for the code development project. Certain embodiments of the tool are described below.

According to one embodiment, an apparatus includes a memory and a hardware processor communicatively coupled to the memory. The memory stores a machine learning model. The hardware processor accesses a first database. The first database stores a code development project. The code development project includes a code trunk, a first code branch, and a second code branch. The code trunk includes a plurality of blocks of code. The first code branch includes a first modified copy of the code trunk. The second code branch includes a second modified copy of the code trunk. The processor also copies the first code branch and the second code branch from the first database. The processor additionally merges the first code branch and the second code branch into an integrated code. Merging the first code branch and the second code branch into the integrated code includes identifying a first conflict between the first code branch and the second code branch. The first conflict indicates that a first code block of the first code branch is inconsistent with a first code block of the second code branch. Merging the first code branch and the second code branch into the integrated code also includes identifying a second conflict between the first code branch and the second code branch. The second conflict indicates that a second code block of the first code branch is inconsistent with a second code block of the second code branch. Merging the first code branch and the second code branch into the integrated code additionally includes applying the machine learning model to the first conflict. The machine learning model determines a resolution for the first conflict based in part on a set of requirements for the code development project. In response to applying the machine learning model to the first conflict, merging the first code branch and the second code branch into the integrated code includes applying the resolution for the first conflict to the integrated code. Merging the first code branch and the second code branch into the integrated code also includes applying the machine learning model to the second conflict. The machine learning model determines a resolution for the second conflict based in part on the set of requirements for the code development project and the resolution for the first conflict. In response to applying the machine learning model to the second conflict, merging the first code branch and the second code branch into the integrated code includes applying the resolution for the second conflict to the integrated code. The processor further stores the integrated code in the first database.

According to another embodiment, a method for merging a first code branch and a second code branch into an integrated code includes identifying a first conflict between the first code branch and the second code branch. The first conflict indicates that a first code block of the first code branch is inconsistent with a first code block of the second code branch. Here, the first code branch includes a first modified copy of a code trunk and the second code branch includes a second modified copy of the code trunk. The code trunk includes a plurality of blocks of code. The code trunk, the first code branch, and the second code branch are parts of a code development project. The method also includes identifying a second conflict between the first code branch and the second code branch. The second conflict indicates that a second code block of the first code branch is inconsistent with a second code block of the second code branch. The method additionally includes applying a machine learning model to the first conflict. The machine learning model determines a resolution for the first conflict based in part on a set of requirements for the code development project. In response to applying the machine learning model to the first conflict, the method includes applying the resolution for the first conflict to the integrated code. The method further includes applying the machine learning model to the second conflict. The machine learning model determines a resolution for the second conflict based in part on the set of requirements for the code development project and the resolution for the first conflict. In response to applying the machine learning model to the second conflict, the method includes applying the resolution for the second conflict to the integrated code.

According to a further embodiment, a system includes a first database, a second database, a memory, and a hardware processor communicatively coupled to the memory. The first database is operable to store a code development project. The code development project includes a code trunk, a first code branch, and a second code branch. The code trunk includes a plurality of blocks of code, the first code branch includes a first modified copy of the code trunk, and the second code branch includes a second modified copy of the code trunk. The memory is operable to store a machine learning model. The hardware processor is operable to access the first database. The processor is also operable to copy the first code branch and the second code branch from the first database. The processor is additionally operable to merge the first code branch and the second code branch into an integrated code. Merging the first code branch and the second code branch into the integrated code includes identifying a first conflict between the first code branch and the second code branch. The first conflict indicates that a first code block of the first code branch is inconsistent with a first code block of the second code branch. Merging the first code branch and the second code branch into the integrated code also includes identifying a second conflict between the first code branch and the second code branch. The second conflict indicates that a second code block of the first code branch is inconsistent with a second code block of the second code branch. Merging the first code branch and the second code branch into the integrated code additionally includes applying the machine learning model to the first conflict. The machine learning model determines a resolution for the first conflict based in part on the set of requirements. In response to applying the machine learning model to the first conflict, merging the first code branch and the second code branch into the integrated code includes applying the resolution for the first conflict to the integrated code. Merging the first code branch and the second code branch into the integrated code further includes applying the machine learning model to the second conflict. The machine learning model determines a resolution for the second conflict based in part on the set of requirements and the resolution for the first conflict. In response to applying the machine learning model to the second conflict, merging the first code branch and the second code branch into the integrated code includes applying the resolution for the second conflict to the integrated code. The hardware processor is further operable to store the integrated code in the first database.

Certain embodiments provide one or more technical advantages. For example, an embodiment increases the efficiency of the merging process that is used to reconcile multiple independent changes made to source code stored in a source code repository, by automatically identifying and resolving conflicts between these independent changes. As another example, an embodiment reduces the time between deployments of updated versions of software, by increasing the time that software developers are able to spend updating the software, as opposed to resolving conflicts. The system described in the present disclosure may particularly be integrated into a practical application of a code conflict resolution tool for use in a version control system. For example, rather than simply identifying for a user conflicts between two or more branches of code that the user is attempting to merge together, a version control system employing the code conflict resolution tool may automatically resolve the identified conflicts, freeing up the user to focus on code development/improvements, rather than conflict remediation.

Certain embodiments may include none, some, or all of the above technical advantages. One or more other technical advantages may be readily apparent to one skilled in the art form the figures, descriptions, and claims included herein.

BRIEF DESCRIPTON OF THE DRAWINGS

For a more complete understanding of the present disclosure, reference is now made to the following description, taken in conjunction with the accompanying drawings, in which.

DETAILED DESCRIPTION

Embodiments of the present disclosure and its advantages may be understood by referring to FIGS. 1 through 5 of the drawings, like numerals being used for like and corresponding parts of the various drawings.

I. System Overview

Figure 1:
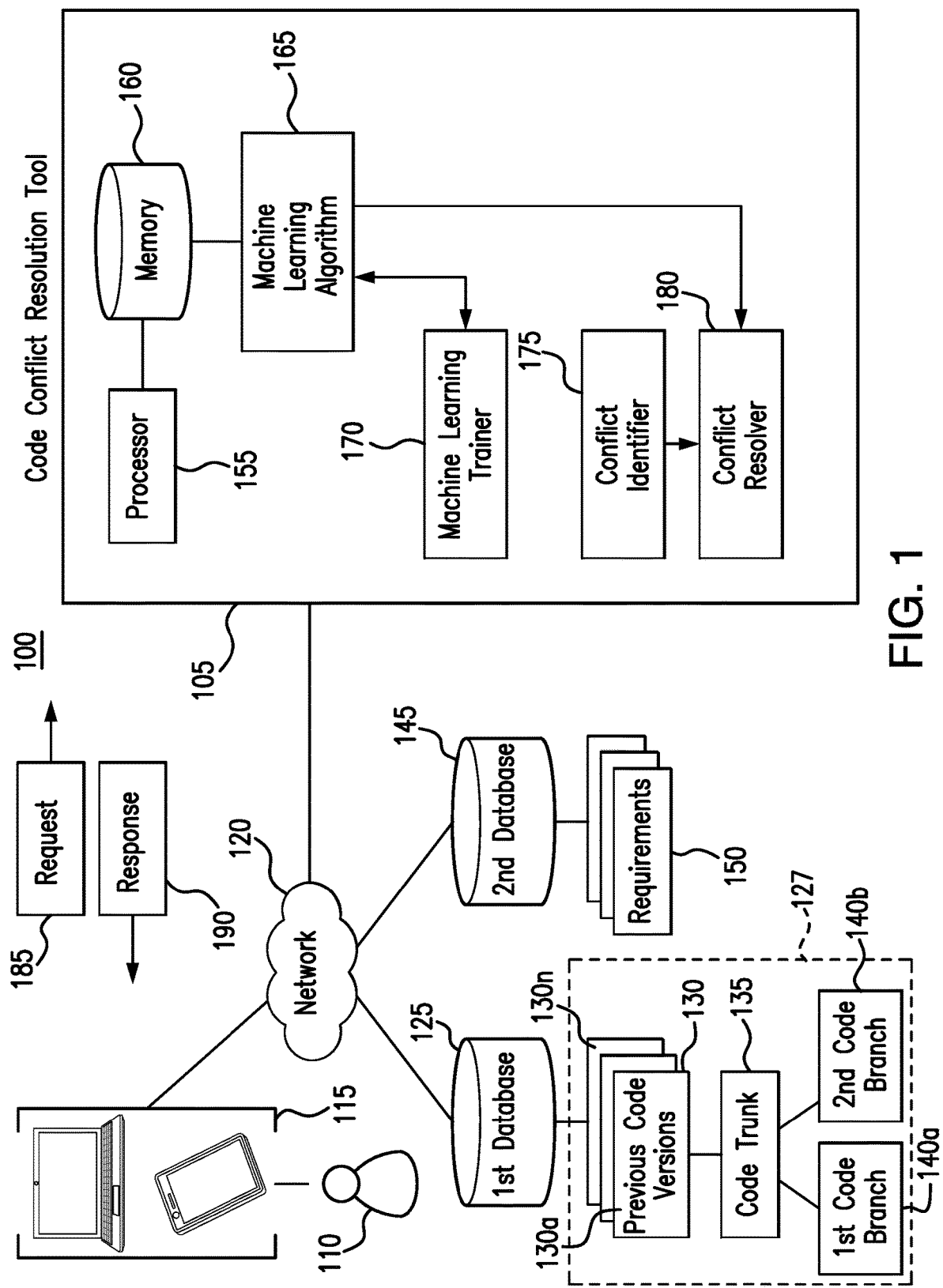
FIG. 1 illustrates an example code conflict resolution system.

FIG. 1 illustrates an example system 100 that includes code conflict resolution tool 105, user(s) 110, device(s) 115, network 120, first database 125, and second database 145. Generally, code conflict resolution tool 105 identifies conflicts between different branches 140a and 140b of a code development project 127, stored in first database 125, and uses a machine learning algorithm 165 to automatically resolve such conflicts. The manner by which code conflict resolution tool 105 performs such tasks will be described in further detail below, in the discussion of FIGS. 2 through 4.

Devices 115 may be used by users 110 to send requests 185 to code conflict resolution tool 105 and to receive responses 190 from code conflict resolution tool 105. Requests 185 may include requests for code conflict resolution tool 105 to merge one or more branches of code 140a into trunk 135, or into another branch 140b. In such instances, responses 190 may provide an indication to user 110 that the requested merge was performed successfully. Requests 185 may also indicate that users 110 are seeking an updated version of the code development project, stored in first database 125, generated as a result of one or more merges performed by code conflict resolution tool 105. In such instances, responses 190 may include the updated version of the code.

Devices 115 include any appropriate device for communicating with components of system 100 over network 120. For example, devices 115 may be a telephone, a mobile phone, a computer, a laptop, a wireless or cellular telephone, a tablet, a server, and IoT device, and/or an automated assistant, among others. This disclosure contemplates devices 115 being any appropriate device for sending and receiving communications over network 120. Device 115 may also include a user interface, such as a display, a microphone, keypad, or other appropriate terminal equipment usable by user 110. In some embodiments, an application executed by a processor of device 115 may perform the functions described herein.

Network 120 facilitates communication between and amongst the various components of system 100. This disclosure contemplates network 120 being any suitable network operable to facilitate communication between the components of system 100. Network 120 may include any interconnecting system capable of transmitting audio, video, signals, data, messages, or any combination of the preceding. Network 120 may include all or a portion of a public switched telephone network (PSTN), a public or private data network, a local area network (LAN), a metropolitan area network (MAN), a wide area network (WAN), a local, regional, or global communication or computer network, such as the Internet, a wireline or wireless network, an enterprise intranet, or any other suitable communication link, including combinations thereof, operable to facilitate communication between the components.

First database 125 stores a code development project 127 that includes code trunk 135, first code branch 140a, second code branch 140b, and previous versions of the code 130 (for example, previous versions of the code trunk and/or previous code branches). Code trunk 135 corresponds to the main body of the code development project. For example, code trunk 135 may correspond to the latest version of the code. First code branch 140a corresponds to a copy of code trunk 135 that includes a first set of changes and second code branch 140b corresponds to a copy of code trunk 135 that includes a second set of changes. For example, first code branch 140a may include changes made by a first software developer implementing a first feature into the code, while second code branch 140b may include changes made by a second software developer implementing a second feature into the code. First database 125 may include any suitable storage element for storing a code development project 127. For example, first database 125 may correspond to a source code repository.

Second database 145 stores a set of requirements 150 for code development project 127 stored in first database 125. Set of requirements 150 may include descriptions of the features that are to be included in code development project 127. For example, set of requirements 150 may include one or more plain text documents describing the features that are to be implemented into code development project 127. Second database 145 may include any suitable storage element for storing a set of requirements 150 for a code development project 127. This disclosure contemplates that second database 145 may be the same storage element as first database 125, or a different storage element from first database 125.

As seen in FIG. 1, code conflict resolution tool 105 includes a processor 155 and a memory 160. This disclosure contemplates processor 155 and memory 160 being configured to perform any of the functions of code conflict resolution tool 105 described herein. Generally, code conflict resolution tool 105 implements machine learning trainer 170, conflict identifier 175, and conflict resolver 180. Machine learning trainer 170 trains machine learning algorithm 165, based on previous versions of the code 130a through 130n and the set of requirements 150, to resolve conflicts between different code branches 140a and 140b, as described in further detail below, in the discussion of FIG. 2. Conflict identifier 175 identifies conflicts between different code branches 140a and 140b, as described in further detail below, in the discussion of FIG. 3. Conflict resolver 180 implements machine learning algorithm 165 to automatically resolve the conflicts identified by conflict identifier 175, as described in further detail below, in the discussion of FIG. 4.

Processor 155 is any electronic circuitry, including, but not limited to microprocessors, application specific integrated circuits (ASIC), application specific instruction set processor (ASIP), and/or state machines, that communicatively couples to memory 160 and controls the operation of code conflict resolution tool 105. Processor 155 may be 8-bit, 16-bit, 32-bit, 64-bit or of any other suitable architecture. Processor 155 may include an arithmetic logic unit (ALU) for performing arithmetic and logic operations, processor registers that supply operands to the ALU and store the results of ALU operations, and a control unit that fetches instructions from memory and executes them by directing the coordinated operations of the ALU, registers and other components. Processor 155 may include other hardware and software that operates to control and process information. Processor 140 executes software stored on memory to perform any of the functions described herein. Processor 155 controls the operation and administration of code conflict resolution tool 105 by processing information received from network 120, device(s) 115, and memory 160. Processor 155 may be a programmable logic device, a microcontroller, a microprocessor, any suitable processing device, or any suitable combination of the preceding. Processor 155 is not limited to a single processing device and may encompass multiple processing devices.

Memory 160 may store, either permanently or temporarily, data, operational software, or other information for processor 155. Memory 160 may include any one or a combination of volatile or non-volatile local or remote devices suitable for storing information. For example, memory 160 may include random access memory (RAM), read only memory (ROM), magnetic storage devices, optical storage devices, or any other suitable information storage device or a combination of these devices. The software represents any suitable set of instructions, logic, or code embodied in a computer-readable storage medium. For example, the software may be embodied in memory 145, a disk, a CD, or a flash drive. In particular embodiments, the software may include an application executable by processor 155 to perform one or more of the functions described herein.

Memory 160 may also store machine learning algorithm 165. This disclosure contemplates that machine learning algorithm 165 is any machine learning algorithm trained to resolve conflicts between different versions of a code (e.g., different branches 140 of a code development project 127). Ideally, machine learning algorithm 165 is an algorithm configured to process a sequence of conflicts, under the assumption that the resolution of later conflicts may be dependent on the resolution of previous conflicts. For example, in certain embodiments, machine learning algorithm 165 is a recurrent neural network, long short-term memory model.

Modifications, additions, or omissions may be made to the systems described herein without departing from the scope of the invention. For example, system 100 may include any number of users 110, devices 115, networks 120, first databases 125, and second databases 145. The components may be integrated or separated. Moreover, the operations may be performed by more, fewer, or other components. Additionally, the operations may be performed using any suitable logic comprising software, hardware, and/or other logic.

II. Training the Machine Learning Algorithm to Resolve Code Conflicts

Figure 2:
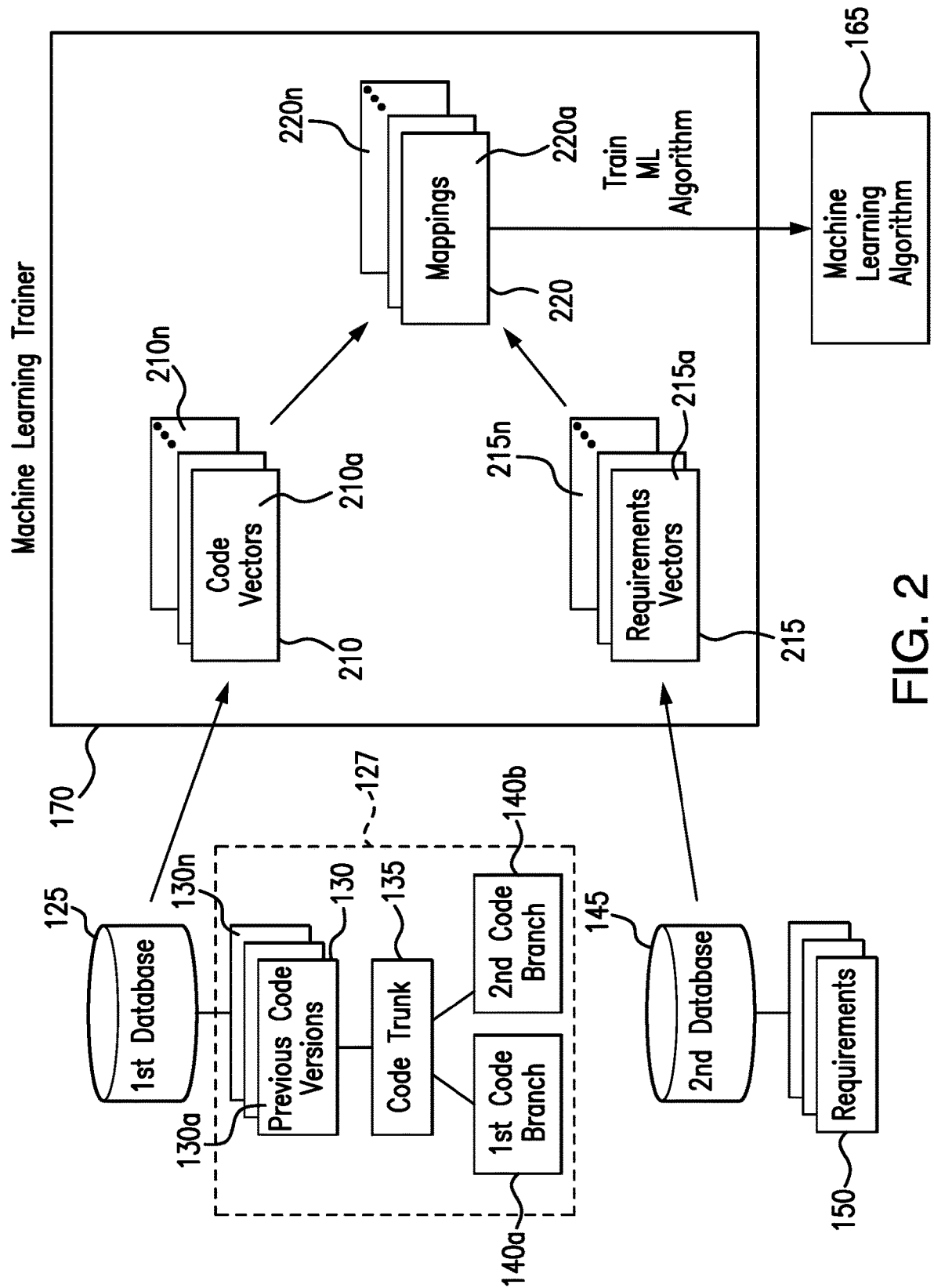
FIG. 2 illustrates the machine learning trainer of the code conflict resolution tool of the system of FIG. 1.

FIG. 2 illustrates an example machine learning trainer component 170 of code conflict resolution tool 105. Machine learning trainer 170 is configured to train machine learning algorithm 165 to resolve conflicts between different branches 140a and 140b of a code development project, based on all or a portion of the code corpus of the code development project 127 as well as a set of requirements 150 for code development project 127.

As illustrated in FIG. 2, machine learning trainer 170 uses the code corpus of code development project 127 and the set of requirements 150 to train machine learning algorithm 165 by establishing a set of mappings 220 between the code corpus and the requirements, and then training machine learning algorithm 165 based on the set of mappings 220. In order to provide mappings 220 to machine learning algorithm 165 in a form that can be used by the algorithm, machine learning trainer 170 first converts both the code corpus of the code development project 127 as well as the set of requirements 150 into vectors. For example, machine learning trainer 170 converts the code corpus of code development project 127 into code vectors 210 and converts the set of requirements 150 in requirements vectors 215.

Machine learning trainer 170 may use any suitable method to convert the code corpus of code development project 127 into code vectors 210. As an example, in certain embodiments, machine learning trainer 170 uses the open-source code2vec routine to generate code vectors 210. Uri Alon, Meital Zilberstein, Omer Levy, and Eran Yahav, *code2vec: Learning Distributed Representations of Code*, POPL (2019). Similarly, machine learning trainer 170 may use any suitable method to convert the set of requirements 150 into requirements vectors 215. As an example, in certain embodiments, machine learning train 170 uses the open-source word2vec routine to generate requirements vectors 215.

Machine learning trainer 170 may generate a requirements vector 215 for each requirement specified in set of requirements 150. Similarly, machine learning trainer 170 may generate a code vector 210 for each block/segment of code associated with a particular requirement for code development project 127, as specified in set of requirements 150. In generating code vectors 210, machine learning trainer 170 may consider either the entire code corpus of code development project 127 or a subset of the code corpus of code development project 127. As an example, machine learning trainer 170 may generate code vectors 210 from code contained in previous code versions 130, code trunk 135, and code branches 140. As another example, machine learning trainer 170 may generate code vectors 210 from code contained in previous code versions 130 and code trunk 135, but not code branches 140.

After generating code vectors 210 and requirements vectors 215, machine learning trainer 170 generates mappings 220 between code vectors 210 and requirements vectors 215. Mappings 220 indicate associations between blocks of code in code development project 127 and requirements specified in set of requirements 150. For example, a first requirement of set of requirements 215 may indicate that code development project 127 should include a function operable to add together a set of numbers. Accordingly, mappings 220 may include a mapping between a requirements vector 210a corresponding to this first requirement and a code vector 215a corresponding to those blocks of code included in code development project 127 that define a function operable to add together a set of numbers.

Machine learning trainer 170 may determine mappings 220 in any suitable manner. As an example, in certain embodiments code conflict resolution tool 105 may receive an indication of the correspondence between given blocks of code of code development project 127 and requirements of the set of requirements 150 from user 110. For example, code conflict resolution tool 105 may receive such an indication in a message 185 transmitted by user 110. As another example, in certain embodiments, machine learning trainer 170 may use one or more documents stored in set of requirements 150 to determine the correspondence between blocks of code included in code development project 127 and requirements of set of requirements 150. For example, set of requirements 150 may include a document specifying, for each requirement of set of requirements 150 implemented into code development project 127, the portions of code included in code development project 127 that implement the requirement. As a further example, in certain embodiments, machine learning trainer 170 may determine the correspondence between blocks of code included in code development project 127 and requirements of set of requirements 150 based on comments included in the blocks of code. For example, comments in a given code block describing the functionality of the given code block may also indicate the requirement of the set of requirements 150 implemented by the code block.

Once machine learning trainer 170 has established mappings 220 between code vectors 210 and requirements 215, machine learning trainer 170 uses mapping 220 to train machine learning algorithm 165. Machine learning trainer 170 trains machine learning algorithm 165 to determine the most probable resolution to a conflict between different versions of a code, based on the resolutions determined for the previous conflicts between the different versions of the code.

Machine learning trainer 170 may be a software module stored in memory 160 and executed by processor 155. An example of the operation of machine learning trainer 170 is as follows: (1) generate code vectors 210 from code development project 127 stored in first database 125; (2) generate requirements vectors 215 from the set of requirements 150 stored in second database 145; (3) generate mappings 220 between code vectors 210 and requirements vectors 215, indicating those code blocks of code development projects 127 associated with given requirements of set of requirements 150; and (4) use mappings 220 to train machine learning algorithm 165.

III. Identifying and Automatically Resolving Code Conflicts

Figure 3:
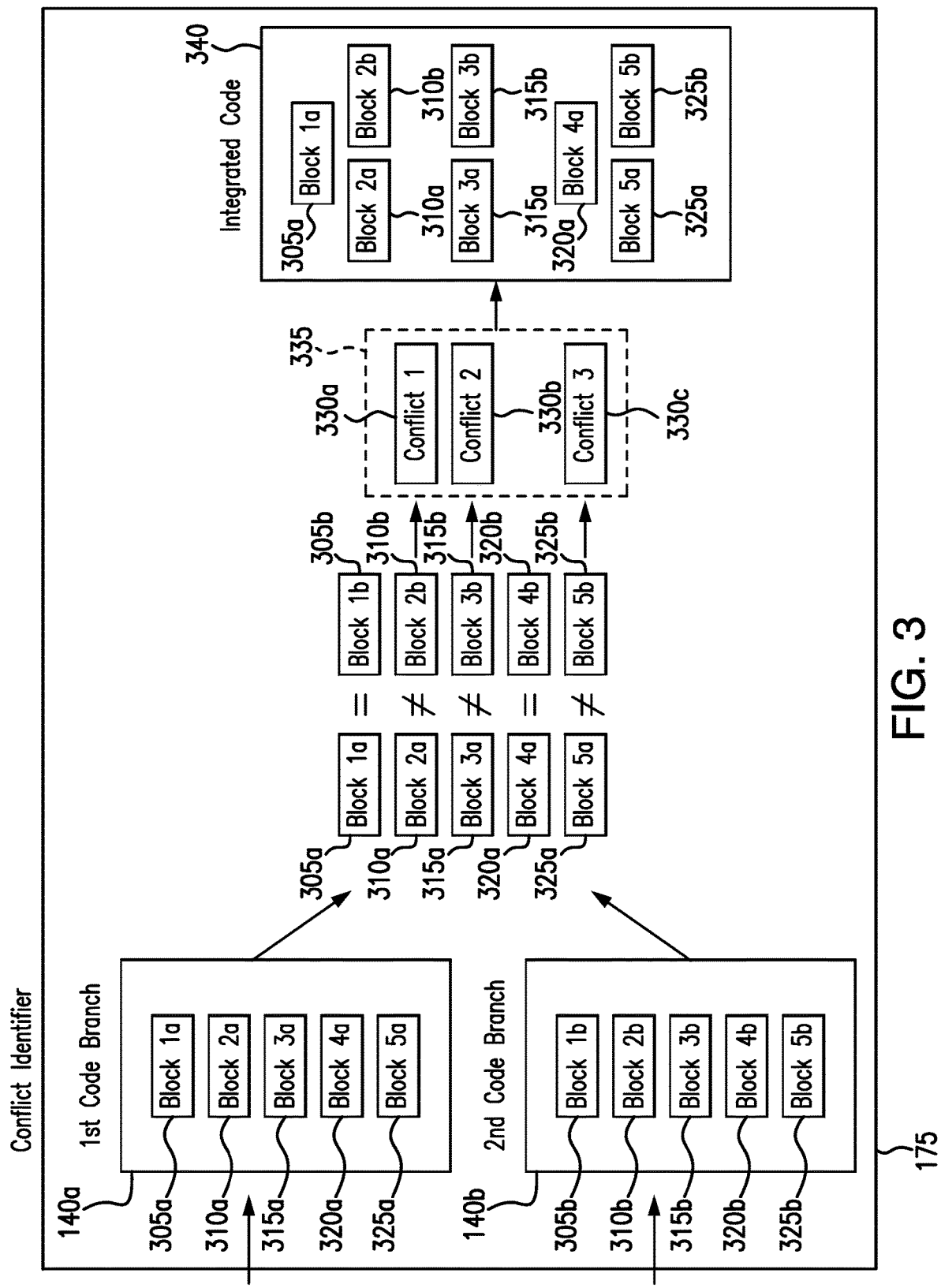
FIG. 3 illustrates the conflict identifier of the code conflict resolution tool of the system of FIG. 1.
Figure 4:
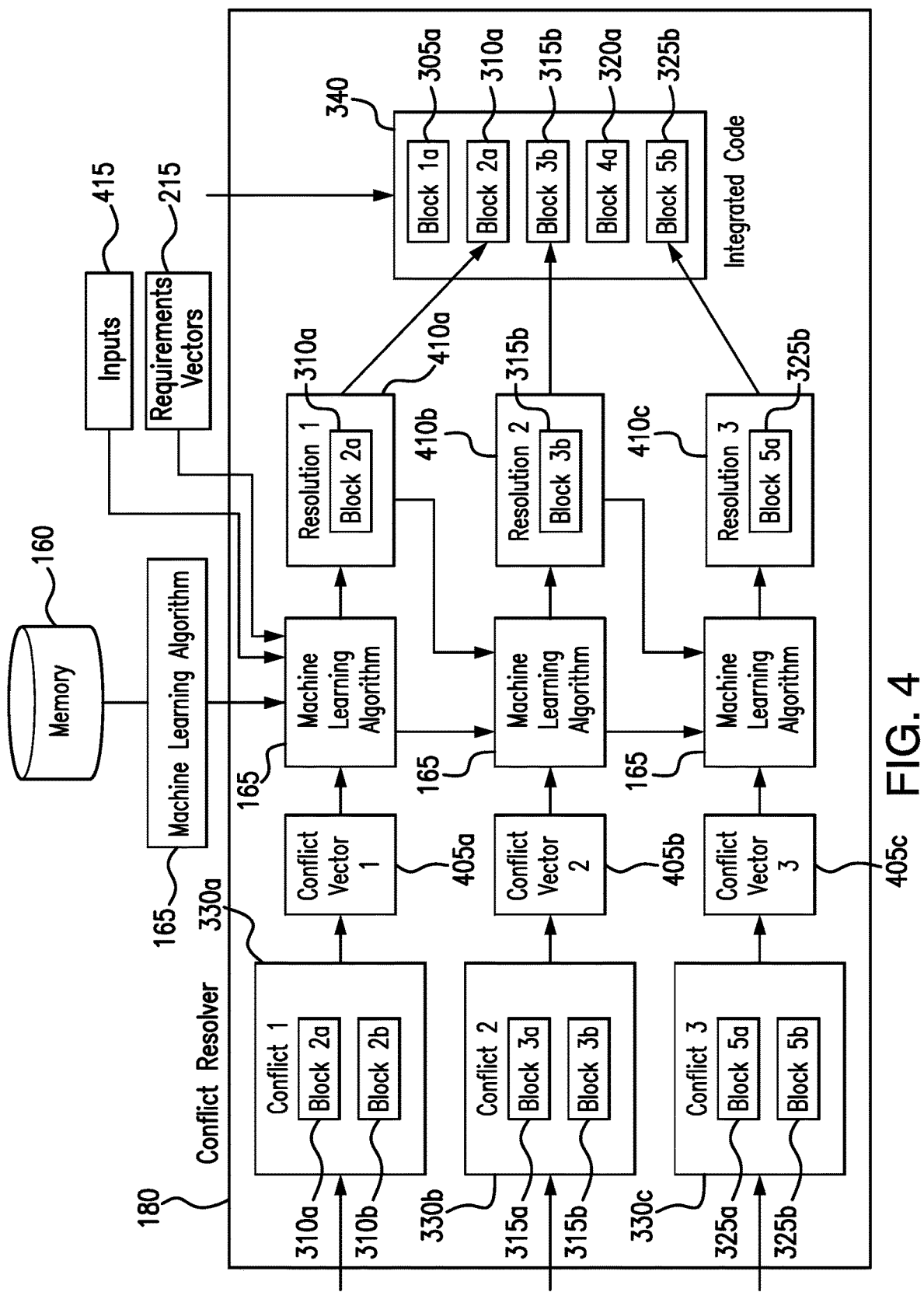
FIG. 4 illustrates the conflict resolver of the code conflict resolution tool of the system of FIG. 1.

Once machine learning trainer 170 has been used to train machine learning algorithm 165, code conflict resolution tool 105 may use machine learning algorithm 165 to resolve a set of conflicts that exist between different versions of a code stored in code development project 127. This may be accomplished first by identifying the conflicts present between the different versions of the code at issue, and then by applying machine learning algorithm 165 one by one to these conflicts. FIGS. 3 and 4 are used to describe these aspects of code conflict resolution tool 105.

FIG. 3 illustrates an example conflict identifier 175 of code conflict resolution tool 105. In the example illustrated in FIG. 3, conflict identifier 175 is shown operating on first code branch 140*a* and second code branch 140*b*, to determine the conflicts 330 that exist between first code branch 140*a* and second code branch 140*b*. As illustrated in FIG. 1, first code branch 140*a* and second code branch 140*b* both derive from a common trunk 135. Accordingly, first code branch 140*a* corresponds to a first copy of trunk 135 into which a first set of changes have been made. Similarly, second code branch 140*b* corresponds to a second copy of trunk 135 into which a second set of changes have been made. Conflict identifier 175 is configured to compare the code of first code branch 140*a* and second code branch 140*b* and to identify differences between these codes that make the codes inconsistent with one another. For example, a first change to first code branch 140*a* is inconsistent with a first change to second code branch 140*b* if it is not possible for both changes to exist simultaneously in a single version of the code. This may occur as a result of a first change having been made to a given line of code in first code branch 140*a* and a second, different change having been made to the same line of code in second code branch 140*b*. This may also occur as a result of the deletion of a given file in first code branch 140*a* in conjunction with the modification of the same file in second code branch 140*b*.

In certain embodiments, prior to identifying conflicts 330 between first code branch 140*a* and second code branch 140*b*, conflict identifier 175 is configured to access first database 125 and download first code branch 140*a* and second code branch 140*b* from first database 125. For example, conflict identifier 175 may access first database 125 in response to receiving a request 185 from user 110 indicating that code conflict resolution tool 105 is to merge together first code branch 140*a* and second code branch 140*b*. On the other hand, in some embodiments, rather than downloading first code branch 140*a* and second code branch 140*b* from first database 125, conflict identifier 175 (and code conflict resolution tool 105, in general), is configured to operate directly on code development project 127. For example, code conflict resolution tool 105 may operate directly on code development project 127 stored in first database 125, when code conflict resolution tool 105 is implemented into a version control system operating on first database 125.

Once conflict identifier 175 has gained access to first code branch 140*a* and second code branch 140*b* (either by downloading the branches from first database 125 or simply accessing the branches on first database 125), conflict identifier 175 is configured to identify conflicts 330 between first code branch 140*a* and second code branch 140*b*. The example illustrated in FIG. 3 presents a simplified example in which first code branch 140*a* and second code branch 140*b* each include five blocks of code (blocks 305*a* through 325*a* for first code branch 140*a* and blocks 305*b* through 325*b* for second code branch 140*b*). Conflict identifier 175 may then identify conflicts between first code branch 140*a* and second code branch 140*b* by comparing each code block from first code branch 140*a* with its corresponding code block in second code branch 140*b*. For example, conflict identifier 175 may compare first code block 305*a* from first code branch 140*a* with first code block 305*b* from second code branch 140*b*. If conflict identifier 175 determines that first code block 305*a* includes the same code as second code block 305*b*, conflict identifier 175 may determine that a conflict is not present between first code block 305*a* and second code block 305*b*. On the other hand, if conflict identifier 175 compares second code block 310*a* from first code branch 140*a* with second code block 310*b* from second code branch 140*b* and determines that code included in second code block 310*a* is inconsistent with code included in second code block 310*b*, conflict identifier 175 may determine that a first conflict 330*a* exists between first code branch 140*a* and second code branch 140*b*. Similarly, if conflict identifier 175 compares third code block 315*a* from first code branch 140*a* with third code block 315*b* from second code branch 140*b* and determines that code included in third code block 315*a* is inconsistent with code included in third code block 315*b*, conflict identifier 175 may determine that a second conflict 330*b* exists between first code branch 140*a* and second code branch 140*b*. As illustrated in FIG. 3, conflict identifier 175 may also determine that a third conflict 330*c* exists between fifth code block 325*a* from first code branch 140*a* and fifth code block 325*b* from second code branch 140*b*, while no conflict exists between fourth code block 320*a* from first code branch 140*a* and fourth code block 320*b* from second code branch 140*b*.

While the example provided in FIG. 3 illustrates a simplified example of the conflict identification process conducted by conflict identifier 175, this disclosure contemplates that conflict identifier 175 may identify conflicts between different branches of code 140 in any suitable manner. For example, when integrated into an existing version control system, conflict identifier 175 may rely on the conflict identification functionality included in the version control system to identify conflicts 330.

Additionally, while the example provided in FIG. 3 illustrates the use of conflict identifier 175 to identify a set of conflicts 330 between a first code branch 140*a* and a second code branch 140*b*, this disclosure contemplates that conflict identifier 175 may act to identify conflicts 330 between any number of different code branches 140. Furthermore, conflict identifier 175 is not limited to identifying conflicts between code branches 140. Rather, conflict identifier 175 may be used to identify conflicts between any different versions of a code, any time that multiple different versions of the code exist. As an example, conflict identifier 175 may be used to identify conflicts between a working copy of code and a code branch from which the working copy was generated. For example, during the code development process, a developer may wish to generate a working copy of a code branch and save this working copy to the developer's local computer. The developer may then implement changes into the working copy independent of the code branch from which the working copy was generated. Once the developer has finished implementing his/her changes, the developer may seek to merge these changes into the original code branch. However, other developers may have implemented changes to the code branch in the intervening time since the developer initially generated his/her working copy. Accordingly, conflict identifier 175 may be used to identify conflicts between the developer's working copy and the current form of the code branch from which the working copy was generated.

As another example, identifying conflicts 330 between first code branch 140*a* and second code branch 140*b* may include merging first code branch 140*a* into code trunk 135 (e.g., implementing the changes from first code branch 140*a* into code trunk 135), and then identifying conflicts 330 between second code branch 140b and code trunk 135.

Conflict identifier 175 may be configured to identify conflicts 330 between first code branch 140a and second code branch 140b at any suitable times. For example, conflict identifier 175 may be configured to identify conflicts 330 between first code branch 140a and second code branch 140b in response to a request 185 received from user 110. As another example, in certain embodiments, conflict identifier 175 may be configured to identify conflicts 330 between first code branch 140a and second code branch 140b at regular time intervals. In such embodiments, conflict identifier 175 may be configured to notify the developers currently working on first code branch 140a and second code branch 140b of the conflicts that currently exist between first code branch 140a and second code branch 140b, each time conflict identifier 175 identifies conflicts 330 between the two branches.

Conflict identifier 175 is configured to identify all of the conflicts 330 that exist between first code branch 140a and second code branch 140b and generate an ordered queue 335 of these conflicts, where the order of each conflict 330 in queue 335 indicates the order that the conflict 330 occurs in the code. For example, a queue 335 that includes first conflict 330a followed by second conflict 330b and then third conflict 330c indicates that first conflict 330a occurs earlier in code branches 140a and 140b than second conflict 330b, and second conflict 330b occurs earlier in code branches 140a and 140b than third conflict 330c. Conflict identifier 175 is also configured to generate an integrated code 340 that includes conflicts 330.

Conflict identifier 175 may be a software module stored in memory 160 and executed by processor 155. An example of the operation of conflict identifier 175 is as follows: (1) access first database 125; (2) download first code branch 140a and second code branch 140b from first database 125; (3) compare first code branch 140a to second code branch 140b; (4) identify conflicts 330 between first code branch 140a and second code branch 140b; (5) generate an ordered queue 335 of conflicts 330; and (6) generate an integrated code 340 that includes conflicts 330.

Once conflict identifier 175 has identified conflicts 330, conflict identifier 175 passes conflicts 330 and integrated code 340 to conflict resolver 180 for resolution of the conflicts 330 present in integrated code 340. FIG. 4 illustrates an example conflict resolver 180 of code conflict resolution tool 105. As illustrated in FIG. 4, conflict resolver 180 receives conflicts 330a through 330c from conflict identifier 175. Each conflict 330 includes an identification of all the code blocks and files related to the conflict. For example, first conflict 330a identifies second code block 310a from first code branch 140a and second code block 310b from second code branch 140b, second conflict 330b identifies third code block 315a from first code branch 140a and third code block 315b from second code branch 140b, and third conflict 330c identifies fifth code block 325a from first code branch 140a and fifth code block 325b from second code branch 140b.

Conflict resolver 180 is configured to resolve each conflict 330 one after the other. As illustrated in FIG. 4, conflict resolver 180 begins with first conflict 330a. Conflict resolver 180 first generates a first conflict vector 405a from the code blocks and code files associated with first conflict 330a. Conflict resolver 180 then feeds first conflict vector 405a to machine learning algorithm 165, along with requirements vectors 215. In certain embodiments, conflict resolver 180 may also pass inputs 415 to machine learning algorithm 165.

Inputs 415 may represent input received by code conflict resolution tool 105 from system administrators. For example, inputs 415 may indicate that machine learning algorithm 165 is to give greater weight to the code present in first code branch 140a compared to second code branch 140b. Machine learning algorithm 165 then determines a resolution 410a to first conflict 330a, based on conflict vector 405a, requirements vectors 215, and, optionally, inputs 415. Once conflict resolver 180 has determined resolution 410a to first conflict 330a, conflict resolver 180 applies resolution 410a to integrated code 340. For example, as illustrated in FIG. 4, applying resolution 410a to integrated code 340 may involve accepting second code block 310a from first code branch 140a and rejecting second code block 310b from second code branch 140b.

After resolving first conflict 330a, conflict resolver 180 next turns to second conflict 330b. As with first conflict 330a, conflict resolver 180 first generates second conflict vector 405b from the code blocks and code files associated with second conflict 330b. Conflict resolver 180 then feeds second conflict vector 405b to machine learning algorithm 165, along with requirements vectors 215, and, in certain embodiments, inputs 415. However, in contrast to the resolution of first conflict 330a, since conflict resolver 180 has previously resolved first conflict 330a, conflict resolver 180 additionally passes first resolution 410a for first conflict 330a as input to machine learning algorithm 165. This enables machine learning algorithm 165 to determine a resolution 410b for second conflict 330b based in part on the resolution 410a to first conflict 330a.

Resolving later conflict 330b based on the resolution to earlier conflict 330a may be desirable because later conflicts may be associated with earlier conflicts, such that the resolution of the earlier conflicts affects the available resolutions for the later conflicts. As a simple example, consider a first conflict between first branch 140a and second branch 140b that occurs due to different implementations of an addition function. The addition function written in first branch 140a may take as input a pair of integer numbers. For example,

```
int add(int a, int b){
    int add;
    add = a+b;
    return add;
}.
```

In contrast, the addition function written in second branch 140b may take as input three integer numbers. For example,

```
int add(int a, int b, int c){
    int add;
    add = a+b+c;
    return add;
}.
```

If the machine learning algorithm resolves this conflict by determining that the version of the addition function in first branch 140a should be retained, while the version in second branch 140b should be discarded, the machine learning algorithm should also resolve a later conflict between a line of code from first branch 140a that reads "sum=add(a,b);" and a line of code from second branch 140b that reads "sum=add(a,b,c);" in favor of first branch 140a, as the algorithm has already determined that the addition function, add, should take two integers as input and not three.

As illustrated in FIG. 4, conflict resolver 180 may determine a resolution 410b to second conflict 330b, based on conflict vector 405b, requirements vectors 220, and resolution 410a to first conflict 330a. In response to determining resolution 410b, conflict resolver 180 may apply resolution 410b to integrated code 340. After resolving second conflict 330b, conflict resolver 180 next turns to third conflict 330c, providing machine learning algorithm 165 with resolution 410b for second conflict 330b, such that machine learning algorithm 165 may operate with knowledge of the history of previous resolutions 410a and 410b, in addition to third conflict vector 405c, requirements vectors 220, and, optionally, input 405. After machine learning algorithm 165 determines resolution 410c to third conflict 330c, conflict resolver 180 applies resolution 410c to integrated code 340. By applying resolutions 410a through 410c to integrated code 340, conflict resolver 180 generates an integrated code 340 that is free from conflicts.

In response to generating integrated code 340, code conflict resolution tool 105 may store integrated code 340 in first database 125. In certain embodiments, in response to generating integrated code 340, code conflict resolution tool 105 may store integrated code 340 as a new version of code in first database 125. For example, in some embodiments, in response to generating integrated code 340, code conflict resolution tool 105 may store integrated code 340 as an updated code trunk 135, where the previous code trunk 135 corresponds to a previous version of the code.

Conflict resolver 180 may be a software module stored in memory 160 and executed by processor 155. An example of the operation of conflict resolver 180 is as follows: (1) generate a first conflict vector 405a from the blocks of code and files associated with first conflict 330a; (2) provide first conflict vector 405a and requirements vectors 220 as input to machine learning algorithm 165; (3) use machine learning algorithm 165 to determine a resolution 410 to first conflict 330a; (4) apply resolution 410 to integrated code 340; (5) for each remaining conflict 330b through 330c, provide machine learning algorithm 165 with a conflict vector 405 associated with the conflict as well as the resolutions 410 of the previous conflicts; (6) use machine learning algorithm 165 to determine resolutions 410 to the conflicts based in part on the resolutions 410 to the previous conflicts; (7) apply the resolutions 410 to the integrated code 340; (8) store the integrated code 340 in database 125.

IV. Method for Conflict Identification and Automatic Resolution

Figure 5:
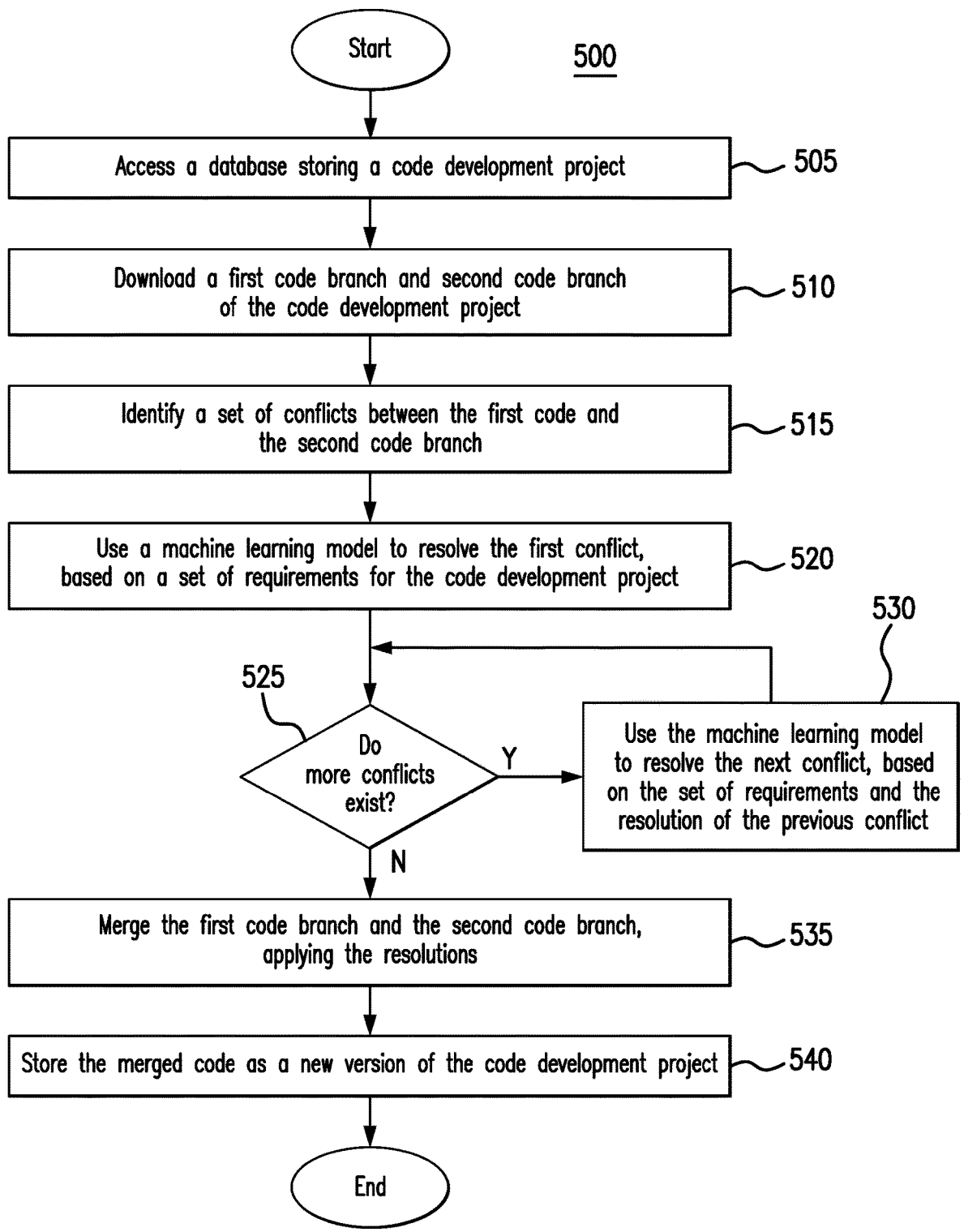
FIG. 5 presents a flowchart illustrating the process by which the code conflict resolution tool of the system of FIG. 1 merges different branches of code into an integrated version of code.

FIG. 5 presents a flowchart illustrating an example method by which code conflict resolution tool 105 identifies and resolves conflicts between branches of code 140a and 140b. In step 505, code conflict resolution tool 105 accesses first database 125, storing a code development project 127 that includes two development branches—first branch 140a and second branch 140b. For example, code conflict resolution tool 105 may access first database 125 in response to receiving a request 185 from user 110 to merge first branch 140a and second branch 140b. In step 510, code conflict resolution tool 105 downloads first code branch 140a and second code branch 140b from first database 125.

In step 515, code conflict resolution tool 105 identifies a set of conflicts 330 between first code branch 140a and second code branch 140b. Conflicts 330 indicate portions of first code branch 140a that are inconsistent with portions of second code branch 140b, such that these inconsistent portions of first code branch 140a and second code branch 140b may not exist simultaneously in a single version of the code.

In response to identifying conflicts 330, code conflict resolution tool 105 passes an ordered list of conflicts 330 to conflict resolver 180.

In step 520, conflict resolver 180 uses machine learning algorithm 165 to resolve first conflict 330a, based on a set of requirements 150 for the code development project 127. Next, in step 525, conflict resolver 180 determines whether additional conflicts 330 exist between first code branch 140a and second code branch 140b. If, in step 525, conflict resolver 180 determines that additional conflicts 330 exist, conflict resolver 180 next uses machine learning algorithm 165 to determine a resolution to the next conflict 330b. Here, in addition to using the set of requirements 150 for the code development project 127, machine learning algorithm 165 also considers the resolution to the previous conflict(s), in determining the resolution to the current conflict. Machine learning algorithm 165 may be any suitable machine learning algorithm configured to determine resolutions to conflicts 330 based in part on the previous resolutions determines for the previous conflicts 330 considered by the algorithm. For example, in certain embodiments, machine learning algorithm 165 is a recurrent neural network long short-term memory model. Conflict resolver 180 repeats steps 525 and 530 until machine learning algorithm 165 has resolved all of conflicts 330.

In step 535, conflict resolver 180 merges first code branch 140a with second code branch 140b, by applying the resolutions to conflicts 330 determined by machine learning algorithm 165. In step 540, conflict resolver 180 stored the merged code as a new version of code in the code development project 127.

Modifications, additions, or omissions may be made to method 500 depicted in FIG. 5. Method 500 may include more, fewer, or other steps. For example, steps may be performed in parallel or in any suitable order. While discussed as code conflict resolution tool 105 (or components thereof) performing the steps, any suitable component of system 100, such as device(s) 115 for example, may perform one or more steps of the method.

Although the present disclosure includes several embodiments, a myriad of changes, variations, alterations, transformations, and modifications may be suggested to one skilled in the art, and it is intended that the present disclosure encompass such changes, variations, alterations, transformations, and modifications as falling within the scope of the appended claims.

What is claimed is:

1. An apparatus, comprising:
  a memory configured to store a machine learning model; and
  a hardware processor communicatively coupled to the memory, the hardware processor configured to:
    access a first database configured to store a code development project comprising:
      a code trunk comprising a plurality of blocks of code;
      a first code branch comprising a first modified copy of the code trunk; and
      a second code branch comprising a second modified copy of the code trunk;
    copy the first code branch and the second code branch from the first database;
    merge the first code branch and the second code branch into an integrated code, wherein merging the first code branch and the second code branch into the integrated code comprises:

identifying a first conflict between the first code branch and the second code branch, the first conflict indicating that a first code block of the first code branch is inconsistent with a first code block of the second code branch;

applying the machine learning model to the first conflict, the machine learning model configured to determine a resolution for the first conflict based in part on a set of requirements for the code development project;

in response to applying the machine learning model to the first conflict, applying the resolution for the first conflict to the integrated code; and store the integrated code in the first database.

2. The apparatus of claim 1, wherein merging the first code branch and the second code branch into the integrated code further comprises:

identifying one or more additional conflicts between the first code branch and the second code branch, the one or more additional conflicts indicating that one or more additional code blocks of the first code branch are inconsistent with one or more code blocks of the second code branch;

in response to applying the machine learning model to the first conflict, applying the machine learning model to the one or more additional conflicts, the machine learning model configured to determine a resolution for the one or more additional conflicts based at least in part on the set of requirements for the code development project and the resolution for the first conflict; and applying the resolution for the one or more additional conflicts to the integrated code.

3. The apparatus of claim 1, wherein:

the code trunk comprises a previous version of the code development project; and storing the integrated code in the first database comprises storing the integrated code in the first database as a new version of the code development project.

4. The apparatus of claim 3, wherein the processor is further configured to:

receive a request for the new version of the code development project from a user; and in response to receiving the request for the new version of the code development project, transmit the new version of the code development project to the user.

5. The apparatus of claim 1, wherein the machine learning model comprises a recurrent neural network, long short-term memory model.

6. The apparatus of claim 1, wherein the hardware processor is further configured to train the machine learning model to resolve the first conflict, based at least in part upon the code development project and the set of requirements for the code development project.

7. The apparatus of claim 6, wherein training the machine learning model comprises providing the machine learning model with a set of mappings between the code development project and the set of requirements, each mapping of the set of mappings between a code block of the code development project and a requirement of the set of requirements.

8. A method for merging a first code branch and a second code branch into an integrated code, the method comprising:

identifying a first conflict between the first code branch and the second code branch, the first conflict indicating that a first code block of the first code branch is inconsistent with a first code block of the second code branch, wherein:

the first code branch comprises a first modified copy of a code trunk comprising a plurality of blocks of code;

the second code branch comprises a second modified copy of the code trunk; and a code development project comprises the code trunk, the first code branch, and the second code branch;

applying a machine learning model to the first conflict, the machine learning model configured to determine a resolution for the first conflict based in part on a set of requirements for the code development project;

in response to applying the machine learning model to the first conflict, applying the resolution for the first conflict to the integrated code; and storing the integrated code in the first database.

9. The method of claim 8, further comprising:

identifying one or more additional conflicts between the first code branch and the second code branch, the one or more additional conflicts indicating that one or more additional code blocks of the first code branch are inconsistent with one or more code blocks of the second code branch;

in response to applying the machine learning model to the first conflict, applying the machine learning model to the one or more additional conflicts, the machine learning model configured to determine a resolution for the one or more additional conflicts based at least in part on the set of requirements and the resolution for the first conflict; and applying the resolution for the one or more additional conflicts to the integrated code.

10. The method of claim 8, wherein storing the integrated code in the first database comprises storing the integrated code as a new version of the code development project, and the code trunk comprises a previous version of the code development project.

11. The method of claim 10, further comprising:

receiving a request for the new version of the code development project from a user; and in response to receiving the request for the new version of the code development project, transmitting the new version of the code development project to the user.

12. The method of claim 8, wherein the machine learning model comprises a recurrent neural network, long short-term memory model.

13. The method of claim 8, further comprising training the machine learning model to resolve the first conflict, based at least in part upon the code development project and the set of requirements for the code development project.

14. The method of claim 13, wherein training the machine learning model comprises providing the machine learning model with a set of mappings between the code development project and the set of requirements, each mapping of the set of mappings between a code block of the code development project and a requirement of the set of requirements.

15. A system comprising:

a first database configured to store a code development project comprising:

a code trunk comprising a plurality of blocks of code;

a first code branch comprising a first modified copy of the code trunk; and a second code branch comprising a second modified copy of the code trunk;

a second database configured to store a set of requirements for the code development project;

a memory configured to store a machine learning model; and a hardware processor communicatively coupled to the memory, the hardware processor configured to:

access the first database;

copy the first code branch and the second code branch from the first database;

merge the first code branch and the second code branch into an integrated code, wherein merging the first code branch and the second code branch into the integrated code comprises:

identifying a first conflict between the first code branch and the second code branch, the first conflict indicating that a first code block of the first code branch is inconsistent with a first code block of the second code branch;

applying the machine learning model to the first conflict, the machine learning model configured to determine a resolution for the first conflict based in part on the set of requirements;

in response to applying the machine learning model to the first conflict, applying the resolution for the first conflict to the integrated code; and store the integrated code in the first database.

16. The system of claim 15, wherein merging the first code branch and the second code branch into the integrated code further comprises:

identifying one or more additional conflicts between the first code branch and the second code branch, the one or more additional conflicts indicating that one or more additional code blocks of the first code branch are inconsistent with one or more code blocks of the second code branch;

in response to applying the machine learning model to the first conflict, applying the machine learning model to the one or more additional conflicts, the machine learning model configured to determine a resolution for the one or more additional conflicts based at least in part on the set of requirements and the resolution for the first conflict; and applying the resolution for the one or more additional conflicts to the integrated code.

17. The system of claim 15, wherein:

the code trunk comprises a previous version of the code development project; and storing the integrated code in the first database comprises storing the integrated code in the first database as a new version of the code development project.

18. The system of claim 17, wherein the processor is further configured to:

receive a request for the new version of the code development project from a user; and in response to receiving the request for the new version of the code development project, transmit the new version of the code development project to the user.

19. The system of claim 15, wherein the machine learning model comprises a recurrent neural network, long short-term memory model.

20. The system of claim 15, wherein the hardware processor is further configured to train the machine learning model to resolve the first conflict, based at least in part upon a set of mappings between the code development project and the set of requirements, each mapping of the set of mappings between a code block of the code development project and a requirement of the set of requirements.

\* \* \* \* \*